United States Patent
Choi

(10) Patent No.: US 9,864,099 B2
(45) Date of Patent: Jan. 9, 2018

(54) APPARATUS AND METHOD FOR CALCULATING WIND LOAD

(71) Applicant: KYUNGPOOK NATIONAL UNIVERSITY INDUSTRY-ACADEMIC COOPERATION FOUNDATION, Daegu (KR)

(72) Inventor: Se-Hyu Choi, Daegu (KR)

(73) Assignee: Kyungpook National University Industry-Academic Cooperation (KR)

( * ) Notice: Subject to any disclaimer, the term of this patent is extended or adjusted under 35 U.S.C. 154(b) by 193 days.

(21) Appl. No.: 14/124,329

(22) PCT Filed: Nov. 19, 2013

(86) PCT No.: PCT/KR2013/010499
§ 371 (c)(1),
(2) Date: Jul. 17, 2015

(87) PCT Pub. No.: WO2014/081171
PCT Pub. Date: May 30, 2014

(65) Prior Publication Data
US 2016/0138984 A1 May 19, 2016

(30) Foreign Application Priority Data

Nov. 20, 2012 (KR) .................. 10-2012-0131816
Nov. 22, 2012 (KR) .................. 10-2012-0133200
(Continued)

(51) Int. Cl.
*G09F 19/00* (2006.01)
*G01W 1/00* (2006.01)
*G01M 9/06* (2006.01)

(52) U.S. Cl.
CPC ............. *G01W 1/00* (2013.01); *G01M 9/06* (2013.01); *F05B 2270/32* (2013.01)

(58) Field of Classification Search
CPC .... F03D 7/00; F05B 2270/30; F05B 2270/32; F05B 2270/332; Y02E 10/723; G06F 19/00; G01W 1/02
See application file for complete search history.

(56) References Cited

U.S. PATENT DOCUMENTS

| | | | |
|---|---|---|---|
| 2012/0065886 A1* | 3/2012 | Kline ...................... | G01W 1/10 702/3 |
| 2014/0028496 A1* | 1/2014 | Schroeder ............... | G01S 13/95 342/26 R |
| 2015/0369959 A1* | 12/2015 | Choi ....................... | G01W 1/02 702/3 |

FOREIGN PATENT DOCUMENTS

| | | |
|---|---|---|
| JP | 2001-133259 A | 5/2001 |
| KR | 10-2005-0007963 A | 1/2005 |

(Continued)

OTHER PUBLICATIONS

Seong et al., "Estimation of Velocity Pressure Exposure Coefficient Using GIS", Journal of Korea Spatial Information Society, vol. 19, No. 1, Feb. 2011, pp. 13-19.
(Continued)

*Primary Examiner* — Huan Tran
(74) *Attorney, Agent, or Firm* — Carter, DeLuca, Farrell & Schmidt, LLP

(57) ABSTRACT

Provided is an apparatus and method for calculating a wind load. The apparatus for calculating a wind load includes an information collecting unit collecting heights of a plurality of points in a region, a frequency distribution calculating unit calculating a frequency distribution for the heights of the plurality of points, and a parameter calculating unit allocating ground surface roughness for ranks in the fre-
(Continued)

quency distribution and calculating parameters for the region by applying weights on the basis of the frequency distribution to parameters set for each ground surface roughness for calculating the wind load.

18 Claims, 18 Drawing Sheets

(30) Foreign Application Priority Data

| Feb. 22, 2013 | (KR) | 10-2013-0019304 |
| Feb. 22, 2013 | (KR) | 10-2013-0019307 |
| Nov. 18, 2013 | (KR) | 10-2013-0140102 |
| Nov. 18, 2013 | (KR) | 10-2013-0140104 |

(56) References Cited

FOREIGN PATENT DOCUMENTS

| KR | 10-0501071 B1 | 7/2005 |
| KR | 10-2006-0063615 A | 6/2006 |
| KR | 10-2011-0016523 A | 6/2007 |
| KR | 10-2007-0108318 A | 11/2007 |
| KR | 1020100024400 A | 3/2010 |
| KR | 2010-0136604 A | 12/2010 |
| KR | 10-2011-0004113 A | 1/2011 |
| KR | 10-0778523 B1 | 2/2011 |
| KR | 10-1055419 B1 | 8/2011 |
| KR | 10-1058191 B1 | 8/2011 |
| KR | 10-1099484 B1 | 12/2011 |
| KR | 101099484 B1 | 12/2011 |
| WO | WO 2014/081170 | * 5/2014 ............. G01C 11/00 |

OTHER PUBLICATIONS

International Preliminary Report on Patentability and Written Opinion issued in corresponding application No. PCT/KR2013/010499 dated May 26, 2015.
Kim Dong Ki, et al., "Development of System Velocity Pressure Exposure Coefficient", KOGSIS, pp. 232-235 (2011).
Min Ho Seong, et al., "Estimation of Velocity Pressure Exposure Coefficient using GIS", Journal of Korea Spatial Information Society, vol. 19, No. 1, pp. 13-19 (2011).
Dae-Young Kim, et. al, "Design of the Structures Regarding Wind Resistance by Wind Tunnel Test", KSCE Magazine, vol. 54, No. 10, pp. 45-55 (2006).
Yee, Junghae, "Proposal of Bundled Structural System using Sky-Bridges in Super-Highrise Building", Advised by Prof. Choi, Sung-Mo Department of Architectural Engineering Graduate School, University of Seoul (Feb. 2012).
Shin-uk Kang, et al., "Impacts of Surface Roughness Integration using Remote Sensing Data: Concentration of Flood Flow Variation", Journal of the Korean Society for GeoSpatial Information System, pp. 33-42 (2007).
"Building structural standard", Ministry of Land, Transport and Maritime Affairs, Notification. 2009-1245.
Son Soo-hyoung, "Material Expression", Practice of Computer Architecture Laboratory Soongsil University, 2010.
Min Ho Seong, et al., "Estimation of the Topographic Factor of Wind Speed Using GIS Information", Journal of Korea Spatial Information Society, vol. 19, No. 5, pp. 47-52 (2011).

* cited by examiner

FIG. 6

| Parameter | Ground Surface Roughness | | | |
|---|---|---|---|---|
| | A | B | C | D |
| Velocity Pressure Exposure Coefficient($K_{zr}$) | 0.58 | 0.81 | 1.0 | 1.13 |
| Topographic Factor($K_{zt}$) | 1.28 | 1.20 | 1.17 | 1.13 |
| Turbulence Intensity($I_z$) | 0.23 | 0.22 | 0.19 | 0.15 |
| Power Law Exponent($\alpha$) | 0.33 | 0.22 | 0.15 | 0.10 |
| Reference Gradient Height($Z_g$) | 500 | 400 | 300 | 250 |
| Planetary Boundary Layer Bottom Height($Z_b$) | 20 | 15 | 10 | 5 |

APPARATUS AND METHOD FOR CALCULATING WIND LOAD

CROSS-REFERENCE TO RELATED APPLICATIONS

This U.S. non-provisional patent application claims priority under 35 U.S.C. §119 of Korean Patent Application Nos. 10-2012-0131816 filed on Nov. 20, 2012, 10-2012-0133200 filed on Nov. 22, 2012, 10-2013-0019304 filed on Feb. 22, 2013, 10-2013-0019307 filed on Feb. 22, 2013, 10-2013-0140102 filed on Nov. 18, 2013, and 10-2013-0140104 filed on Nov. 18, 2013, the entire contents of which are hereby incorporated by reference.

BACKGROUND OF THE INVENTION

The present invention disclosed herein relates to an apparatus and method for calculating a wind load.

In a structure design, wind is one of factors to be necessarily considered. Wind characteristics, such as the wind velocity or wind direction are largely affected by the surrounding topography. Safety of a structure may be largely affected by a high wind velocity due to the surrounding topography. In order to consider a load that wind applies to a structure, a wind load is calculated in designing of the structure.

In a process for calculating a wind load, parameters used for calculating the wind load are determined according to ground surface roughness representing roughness of the ground surface. Typically, this kind of ground surface roughness is determined according to a subjective decision of a designer, and accordingly the parameters are not objectively and reasonably calculated.

SUMMARY OF THE INVENTION

The present invention provides an apparatus and method for calculating a wind load capable of calculating a proper wind load by objectively and reasonably calculating parameters used for wind load calculation.

Embodiments of the present invention provide apparatuses for calculating a wind load, including: an information collecting unit collecting heights of a plurality of points in a region; a frequency distribution calculating unit calculating a frequency distribution for the heights of the plurality of points; and a parameter calculating unit allocating ground surface roughness for ranks in the frequency distribution and calculating parameters for the region by applying weights on the basis of the frequency distribution to parameters set for each ground surface roughness for calculating the wind load.

In some embodiments, the information collecting unit may calculate a height of a building as height information of a point, when the point is positioned at the building, and calculate the height information for the point as 0, when the point is positioned on a ground surface or water surface.

In other embodiments, the plurality of points may be uniformly distributed in the region.

In still other embodiments, the plurality of points may have one-to-one correspondence with buildings in the region.

In even other embodiments, the parameter calculating unit may allocate the ground surface roughness according to a rank size.

In yet other embodiments, the parameters may include at least one of a velocity pressure exposure coefficient, a topographic factor, a turbulence intensity, a power law exponent, a reference gradient height, and a planetary boundary layer bottom height.

In further embodiments, the parameter calculating unit may calculate a relative frequency for each rank and multiply a parameter set for each ground surface roughness by the relative frequency to sum the multiplied results.

In still further embodiments, the information collecting unit may include: a sample point information collecting unit collecting height information for a plurality of sample points in the region; and a target point information obtaining unit obtaining height information for a plurality of target points in the region by using the height information for the plurality of sample points.

In even further embodiments, the target point information obtaining unit may generate a digital elevation model (DEM) by using the height information for the collected sample points, generate a plurality of target points corresponding to grid vertices of the DEM, and calculate height values of the grid vertices of the DEM as the height information for the target points corresponding to the grid vertices.

In yet further embodiments, the target point information obtaining unit may generate a plurality of target points in the region and calculate the height information for the target points by using an interpolation based on the height information for the collected sample points.

In much further embodiments, the information collecting unit may collect information on elevations of the plurality of points in the region, and overall height information that building heights are reflected in the elevations; a ground surface height calculating unit may be further comprised which calculates a ground surface height of the region on the basis of the elevation information; and the frequency distribution calculating unit may calculate the frequency distribution for a difference value between the overall height information calculated for each of the plurality of points and the ground surface height.

In still much further embodiments, the information collecting unit may calculate as the overall height information for a corresponding point by summing a height of a building and an elevation of the ground surface, when the point is positioned at the building, and calculate the overall height information for the corresponding point as an elevation of the ground surface or water surface, when the point is positioned on the ground surface or the water surface.

In even much further embodiments, the ground surface height calculating unit may calculate a minimum value or a maximum frequency of elevations of the plurality of points.

In yet much further embodiments, the ground surface height calculating unit may calculate the frequency distribution for the elevations of the plurality of points and calculate, as the ground surface height, a value of a rank having a maximum frequency, an average value of elevations belonging to a rank having the maximum frequency, a value of the lowest rank, or an average value of elevations belonging to the lowest rank in the frequency distribution.

In still yet much further embodiments, the information collecting unit may further collect position information for the plurality of points in the region, and the ground surface height calculating unit may calculate a regression equation by using a regression analysis based on the position and elevation information, and substituting the position information in the regression equation to calculate the ground surface height of each of the plurality of points.

In even yet much further embodiments, the ground surface height calculating unit may set the position information as an independent variable and the elevation information as a dependent variable to calculate the regression equation.

In yet still much embodiments, the ground surface height calculating unit may calculate the regression equation based on the position and elevation information for some of the plurality of points.

In even yet still much embodiments, the ground surface height calculating unit may calculate the frequency distribution for the elevations of the plurality of points, select points having elevations belonging to a rank having a maximum frequency or a minimum frequency in the frequency distribution, and calculate the regression equation on the basis of the position and elevation information for the selected points.

In other embodiments of the present invention, methods of calculating a wind load, which calculates the wind load by using a wind load calculating apparatus comprising an information collecting unit, a frequency distribution calculating unit, and a parameter calculating unit, the method comprising: collecting, by the information collecting unit, height information for a plurality of points in a region; calculating, by the frequency distribution calculating unit, a frequency distribution for heights of the plurality of points; allocating, by the frequency distribution calculating unit, ground surface roughness to ranks of the frequency distribution; and for calculating the wind load, applying, by the parameter calculating unit, weights based on the frequency distribution to parameters set for each ground surface roughness to calculate parameters for the region.

A wind load calculating method according to an embodiment of the present invention can be embodied as a program executable by a computer and recorded on a computer readable recording medium.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 6 is an exemplary table representing parameters set for ground surface roughness according to an embodiment of the present invention;

DETAILED DESCRIPTION OF PREFERRED EMBODIMENTS

Figure 1:
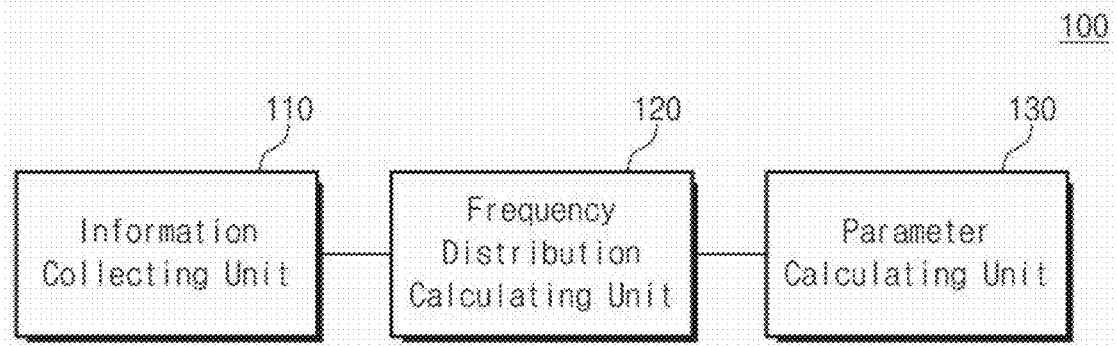
FIG. 1 is an exemplary block diagram illustrating a wind load calculating apparatus according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Unless otherwise defined, all terms (including technical and scientific terms used herein) have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items The term 'unit,' 'segment', 'block', or 'module' as used herein, may mean a unit for processing at least one function or operation. For example, it may refer to, but is not limited to, a software or hardware component, such as a Field Programmable Gate Array (FPGA) or an Application Specific Integrated Circuit (ASIC), which performs certain tasks. The 'unit,' 'segment', 'block', or 'module' may, although not necessarily, be configured to reside on the addressable storage medium and be configured to execute on one or more processors.

Thus, a 'unit,' 'segment', 'block', or 'module' may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables, although not limited thereto. The functionality provided for in the 'units,' 'segments', 'blocks', or 'modules' may be combined into fewer components and 'units,' 'segments', 'blocks', or 'modules' s or may be further separated into additional components and 'units,' 'segments', 'blocks', or 'modules'.

Hereinafter, it will be described about an exemplary embodiment of the present invention in conjunction with the accompanying drawings.

A wind load calculating apparatus and method according to an embodiment of the present invention may collect height information for a plurality of points in a region that is considered in calculating a wind load and calculate a frequency distribution. In addition, parameters for the region may be calculated by applying weights to parameters set for each ground surface roughness on the basis of the frequency distribution. The wind load for the region may be calculated by using the calculated parameters.

A "structure" used herein is a term including a building, a workpiece, a land improvement, a window, an outdoor billboard, and a bridge, and means all products that are arranged in a space and subjected to a wind load.

FIG. 1 is a block diagram illustrating a wind load calculating apparatus according to an embodiment of the present invention.

As illustrated in FIG. 1, the wind load calculating apparatus 100 may include a height information collecting unit 110, a frequency distribution calculating unit 120, and a parameter calculating unit 130. The height information calculating unit 110 may collect height information for a plurality of points in a region 20. Here, the region may be a region that is considered in calculating a wind load and positioned around a structure.

Figure 2:
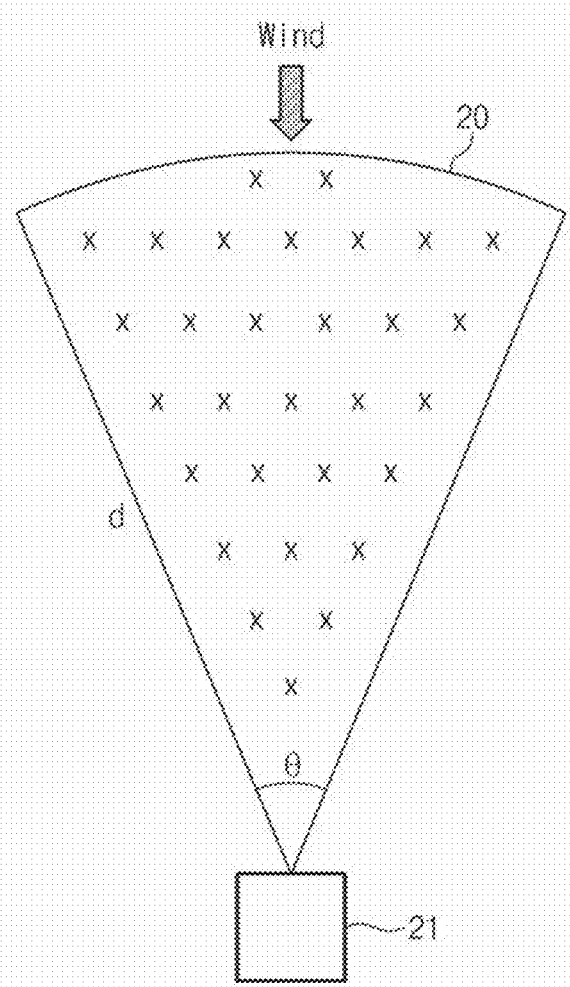
FIGS. 2 and 3 are exemplary views illustrating a plurality of points in a region that is considered in calculating a wind load and a region in which height information is collected according to an embodiment of the present invention.
Figure 3:
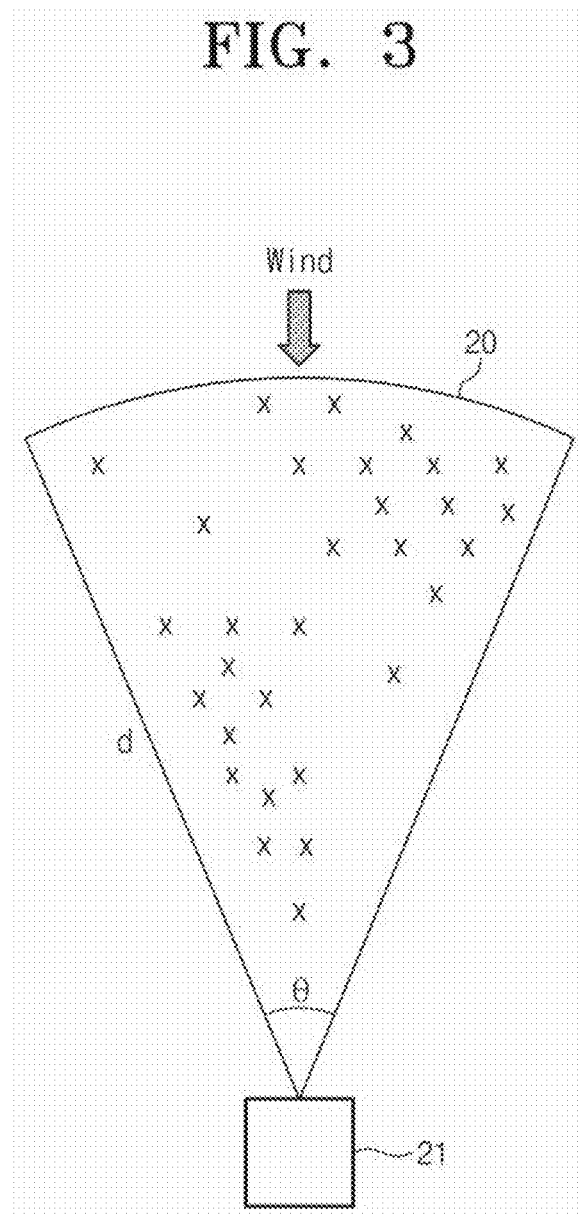

FIGS. 2 and 3 are exemplary views illustrating a region that is considered in calculating a wind load, and a plurality of points for which height information is collected in the region according to embodiments of the present invention.

As shown in FIGS. 2 and 3, the region 20 may have a fan shape halved by an upwind sideline around a structure 21. The central angle θ of the fan shape is about 45°, but may be larger or smaller than that according to embodiments. The radius d of the fan shape may be the smaller one of 40 times a reference height H and 3 km.

Other than FIGS. 2 and 3, the region 20 may be a circle having the radius of d, and the shape of the region is not limited hereto and may have a polygonal or arbitrary shape.

The information collecting unit 110 may collect height information for the plurality of points (denoted as x in FIGS. 2 and 3) in the region 20.

As shown in FIG. 2, according to an embodiment of the present invention, the plurality of points may be uniformly distributed. However, as shown in FIG. 3, the plurality of points may be distributed in an ununiform manner in the region 20 according to another embodiment.

According to an embodiment of the present invention, the information collecting unit 110 may collect the height information for the plurality of points from a digital map of the region 20. According to an embodiment, data about the digital map may be stored in a storage unit (not shown) included in the wind load calculating apparatus 100. In this case, the information collecting unit 110 reads the data about the digital map from the storage unit to collect the height information for the plurality of points in the region 20.

According to another embodiment, the data about the digital map may be stored in a server or an external storage unit connected to the wind load calculating unit 100 over a network. In this case, the information collecting unit 110 may read the data about the digital map from the server or the external storage device over the network or the data interface and collect the height information for the plurality of points in the region 20.

According to an embodiment of the present invention, the information collecting unit 110 may collect the height information for the plurality of points from among data obtained by measuring the region 20 by using at least one of ground survey, global positioning system (GPS) measurement, aerial photogrammetry, radargrammetry, and light detection and ranging (LiDAR) measurement.

According to an embodiment of the present invention, the plurality of points in the region 20 may correspond to buildings positioned in the region. According to an embodiment, the plurality of points in the region 20 may have one-to-one correspondence with the buildings in the region 20. When a building is positioned at one point in the region 20, the information collecting unit 110 may calculate height information for the one point as the height of the building.

According to another embodiment, some of the plurality of points may also correspond to the ground surface or water surface on which a building does not exist. When one point in the region 20 exists on the ground surface or water surface, the information collecting unit 110 may calculate the height of the corresponding point as 0.

According to an embodiment of the present invention, the information collecting unit 110 may extract buildings, elevation points, and a reference point from the digital map of the region. Furthermore, the information collecting unit 110 may extract the centers of buildings from the extracted buildings or joints from outlines, and generate points having one-to-one correspondence for the elevation points and reference point positioned at the joints and on the ground surface. In addition, the height of the point positioned at the building may be calculated as the height of the building and the height of the point positioned on the ground surface may be calculated as 0.

According to an embodiment of the present invention, the height of the building may be calculated as height information of a corresponding point by multiplying the number of building floors by a preset height. The height multiplied to the number of building floors may be 3 m, but it is not limited hereto and may be set higher or lower than 3 m.

According to an embodiment of the present invention, the information collecting unit 110 may extract building and ground surface data through filtering from 3-dimensional dot data collected by using at least one of ground survey, GPS measurement, aerial photogrammetry, radargrammetry, and LiDAR measurement for the region, generate points having one-to-one correspondence with the extracted building and ground surface data, and calculate the height of the point positioned at the building as the height of the building and the height of the point positioned on the ground surface as 0.

Figure 4:
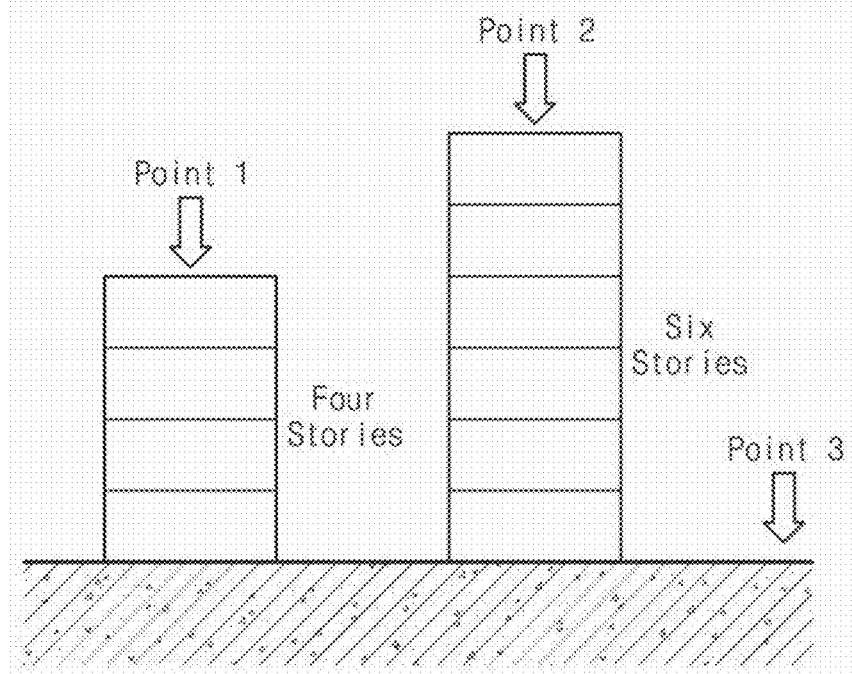
FIG. 4 is an exemplary view illustrating a process of calculating height information for a plurality of points in a region according to an embodiment of the present invention.

FIG. 4 is an exemplary view illustrating a process of calculating height information for a plurality of points in the region 20 according to an embodiment of the present invention.

Referring to FIG. 4, when a building is positioned at a point 1 among the plurality of points in the region 20, the information collecting unit 110 may collect information about the number of building floors. In FIG. 4, the number of floors of the building positioned at the point 1 is 4. The information collecting unit 110 may calculate height information about the corresponding point by multiplying the number of building floors by a preset height (e.g., 3 m). In this case, the height of the point 1 illustrated in FIG. 4 may be calculated as 12 m. Similarly, the height of a point 2 may be calculated as 18 m, and the height of a point 3 may be calculated as 0.

The frequency distribution calculating unit 120 may calculate a frequency distribution for heights of the plurality of points. For example, the frequency distribution calculating unit 120 may divide the heights of the plurality of points into a plurality of ranks and then calculate an arranged frequency distribution by calculating a frequency of points belonging to each rank.

According to an embodiment, the number of ranks may correspond to the number of ranks of ground surface roughness. For example, when the ground surface roughness is divided into 4 ranks, the frequency distribution calculating unit 120 may calculate a frequency distribution where the heights of the plurality of points are arranged with 4 ranks.

Figure 5:
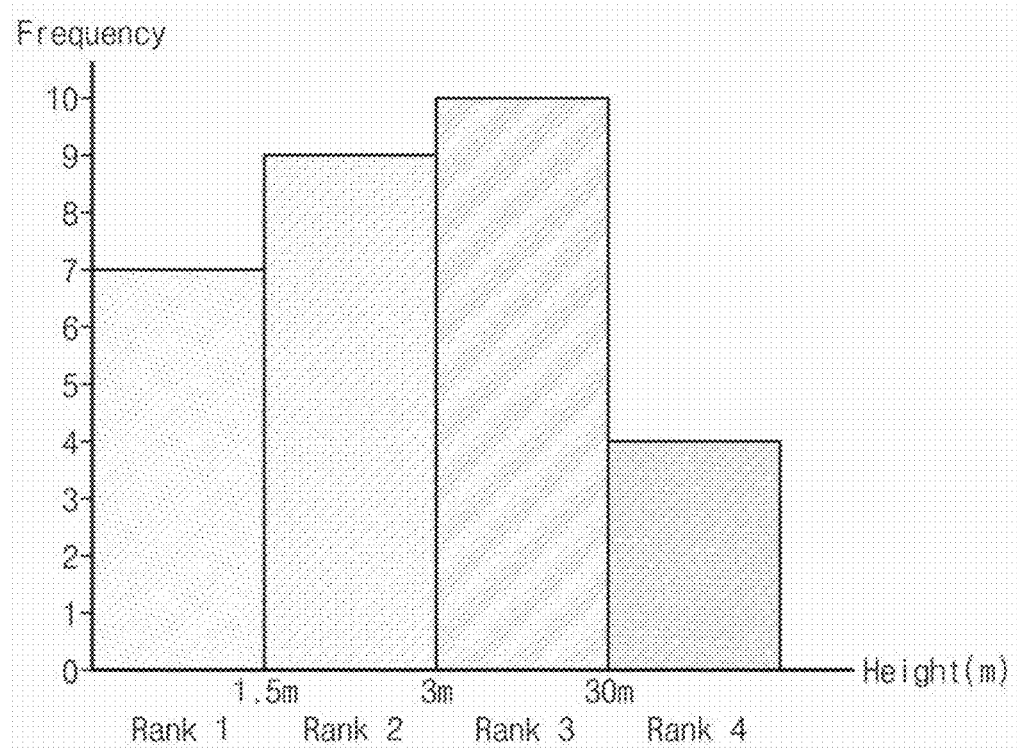
FIG. 5 shows a frequency distribution diagram representing a frequency distribution for heights of a plurality of calculated points in a region according to an embodiment of the present invention.

FIG. 5 is an example of a frequency distribution diagram representing a frequency distribution for the heights of the plurality of points calculated according to an embodiment of the present invention.

As shown in FIG. 5, height information for the plurality of points collected from the region 20 may be divided into 4 ranks and the illustrated frequency distribution diagram represents the frequency of points belonging to each rank on the vertical axis.

The parameter calculating unit 130 may allocate ground surface roughness to ranks of the frequency distribution. According to an embodiment, the parameter calculating unit 130 may allocate the ground surface roughness according to sizes of the ranks.

For example, referring to FIG. 5, the parameter calculating unit 130 may allocate ground surface roughness A having the largest roughness to rank 4 which is a rank having the highest height, ground surface roughness B having the second largest roughness to rank 3 which has the second highest height, ground surface roughness C having the third largest roughness to rank 2 which has the third highest height, and ground surface roughness D having the lowest roughness to rank 1 which has the lowest height.

The parameter calculating unit 130 may calculate parameters of the region 20 by applying weights based on the frequency distribution to parameters set for each ground surface roughness.

According to an embodiment of the present invention, the parameters may be parameters set differently for each ground surface roughness among parameters used for calculating a wind load. For example, the parameters may include at least one of velocity pressure exposure coefficient ($K_{zr}$), topographic factor ($K_{zt}$), turbulence intensity ($I_z$), power law exponent ($\alpha$), reference gradient height ($Z_g$), and planetary boundary layer bottom height ($Z_b$).

According to an embodiment, the parameter calculating unit 130 calculates a relative frequency of each rank forming the frequency distribution, multiplies the relative frequency by parameter values set for each ground surface roughness, and sums the multiplied values to calculate the parameter values for the region.

FIG. 6 is an exemplary table representing the parameter values set for each ground surface roughness according to an embodiment of the present invention.

As shown in FIG. 6, the velocity pressure exposure coefficient ($K_{zr}$), topographic factor ($K_{zt}$), the turbulence intensity ($I_v$), the power law exponent ($\alpha$), the reference gradient height ($Z_g$), and the planetary boundary layer bottom height ($Z_b$) may be set as different values for each ground surface roughness.

In order to obtain parameter values for the region 20, the parameter calculating unit 130 first calculates a relative frequency of each rank of the frequency distribution. For example, referring to the frequency distribution diagram of FIG. 5, the parameter calculating unit 130 may calculate the relative frequency of each rank.

Rank 1: relative frequency 1=7/30≈0.23
Rank 2: relative frequency 2=9/30≈0.3
Rank 3: relative frequency 3=10/30≈0.33
Rank 4: relative frequency 4=4/30≈0.13

Then, the parameter calculating unit 130 multiplies the relative frequency by the parameter values set for each ground surface, and sums the multiplied results to calculate the parameter values of the region 20. For example, the velocity pressure exposure coefficient ($K_{zr}$), topographic factor ($K_{zt}$), turbulence intensity ($I_z$), power law exponent ($\alpha$), reference gradient height ($Z_g$), and planetary boundary layer bottom height ($Z_b$) for the region 20 may be calculated as follows:

$$K_{zr}=0.58\times0.13+0.81\times0.33+1.0\times0.3+1.3\times0.23=0.9026$$

$$K_A=1.28\times0.13+1.20\times0.33+1.17\times0.3+1.13\times0.23=1.1733$$

$$I_z=0.23\times0.13+0.22\times0.33+0.19\times0.3+0.15\times0.23=0.1940$$

$$\alpha=0.33\times0.13+0.22\times0.33+0.15\times0.3+0.10\times0.23=0.1835$$

$$Z_g=500\times0.13+400\times0.33+300\times0.3+250\times0.23=344.5$$

$$Z_b=20\times0.13+15\times0.33+10\times0.3+5\times0.23=11.7$$

The above-described information collecting unit 110, the frequency distribution calculating unit 120, and the parameter calculating unit 130 may be implemented with a processor, for example, a CPU, performing a wind load job by executing a program for calculating the wind load. Furthermore, the program for calculating the wind load may be stored in a storage unit such as a memory and the wind load calculating apparatus may read the program from the storage unit and execute the program.

Figure 7:
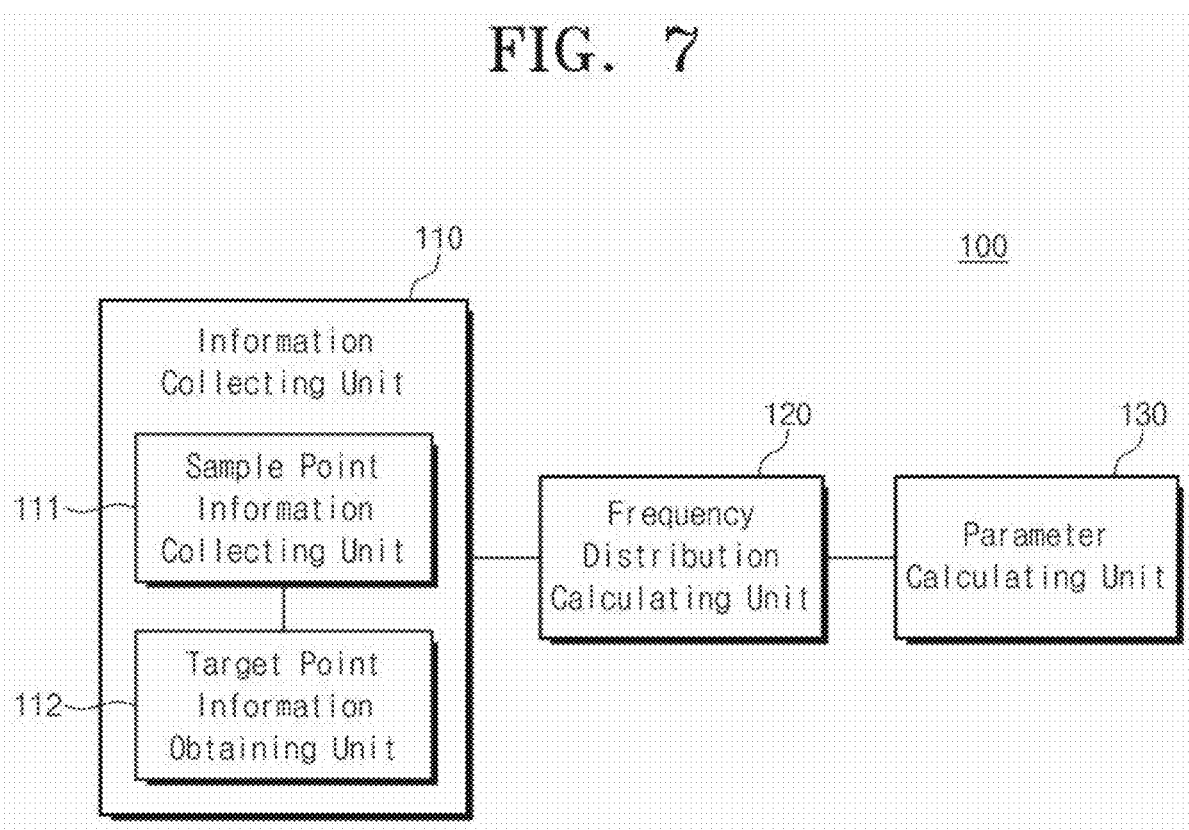
FIG. 7 is an exemplary block diagram illustrating a load calculating apparatus according to an embodiment of the present invention.

FIG. 7 is an exemplary block diagram illustrating a wind load calculating apparatus 100 according to anther embodiment of the present invention.

As shown in FIG. 7, the information collecting unit 110 may include a sample point collecting unit 111 and a target point information obtaining unit 112. The sample point information collecting unit 111 may collect height information for a plurality of sample points in the region 20. The target point information obtaining unit 112 may obtain height information for the plurality of points in the region 20 by using height information for the sample points.

According to an embodiment of the present invention, the sample point height information collecting unit 111 may extract buildings from a digital map and allocate the sample points to the extracted buildings. In addition, the sample point height information collecting unit 111 may extract at least one of elevation points and reference points from the digital map, and allocate at least one of the extracted elevation points and reference points to the sample points.

Figure 8:
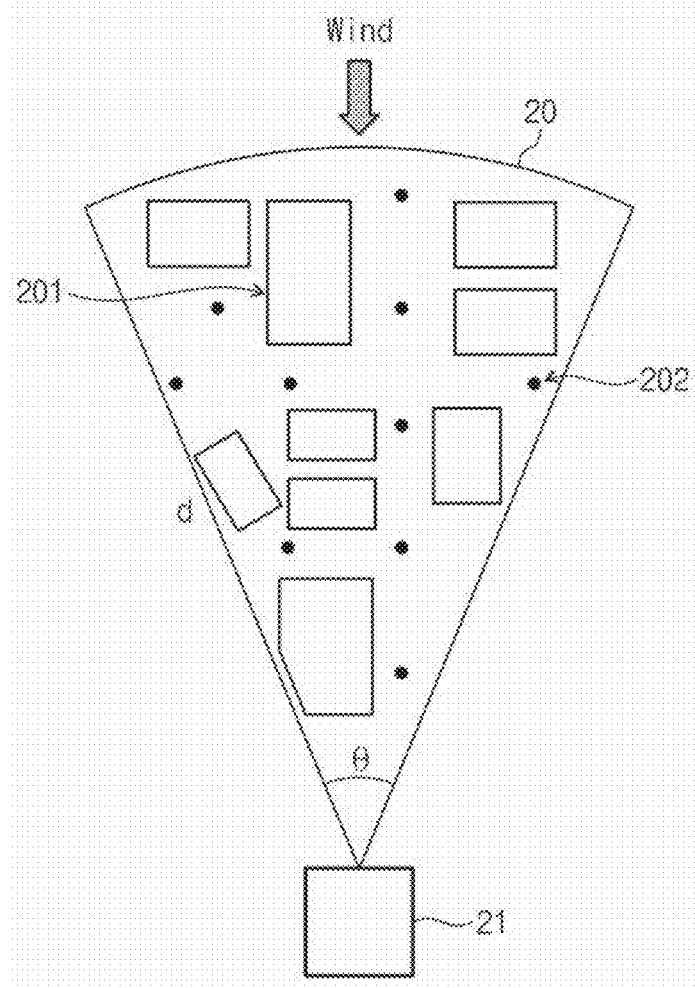
FIG. 8 is an exemplary region considered in calculating a wind load and an exemplary plan view of a building included in the region according to another embodiment of the present invention.

FIG. 8 is an exemplary view illustrating a region considered in calculation of a wind load and a plan view of a building included in the region according to another embodiment of the present invention.

Referring to FIG. 8, the sample point height information collecting unit 111 may extract an object corresponding to a building 201 from the digital map of the region 20 and extract elevation points 202 positioned on the ground surface or water surface. According to embodiments, the sample point height information collecting unit 111 may extract reference points of the digital map or both the elevation points and the reference points instead of the elevation points 202.

Then, the sample point height information collecting unit 111 may allocate the sample points to the extracted buildings, elevations and reference points. According to an embodiment of the present invention, the sample point height information collecting unit 111 may allocate the sample points to the centers of the extracted buildings.

Figure 9:
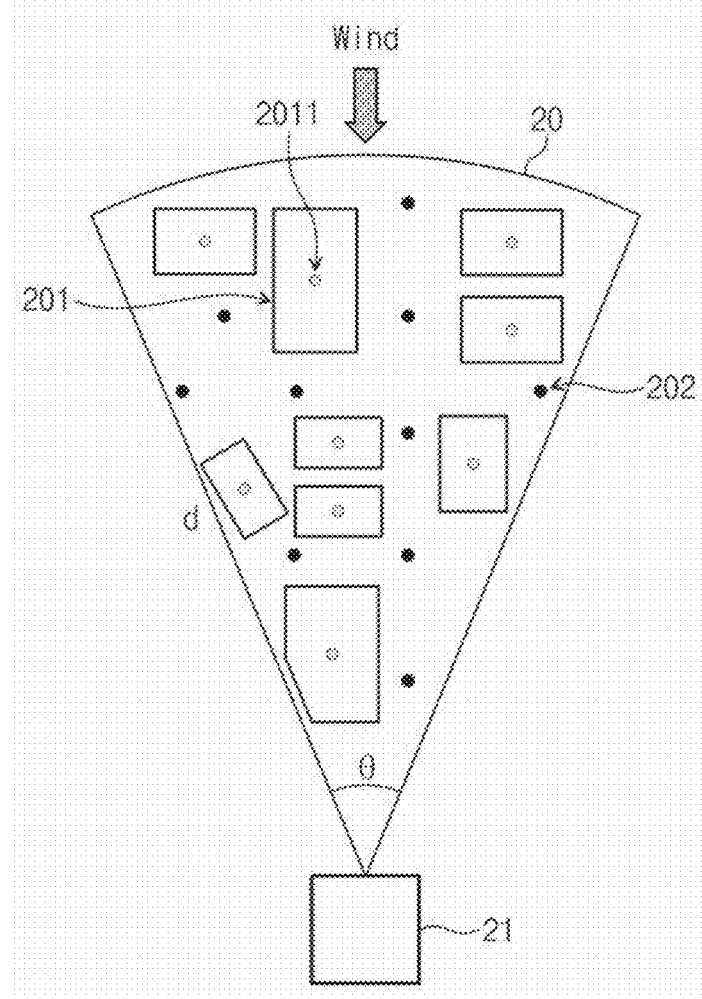
FIG. 9 is an exemplary view illustrating the center of a building included in a region according to another embodiment of the present invention.

FIG. 9 is an exemplary view illustrating the center of the building 201 included in the region 20 according to an embodiment of the present invention.

As shown in FIG. 9, the sample point height information collecting unit 111 may allocate the sample points to the centers 2011 of the extracted buildings 201 from the digital map of the region 20.

Figure 10:
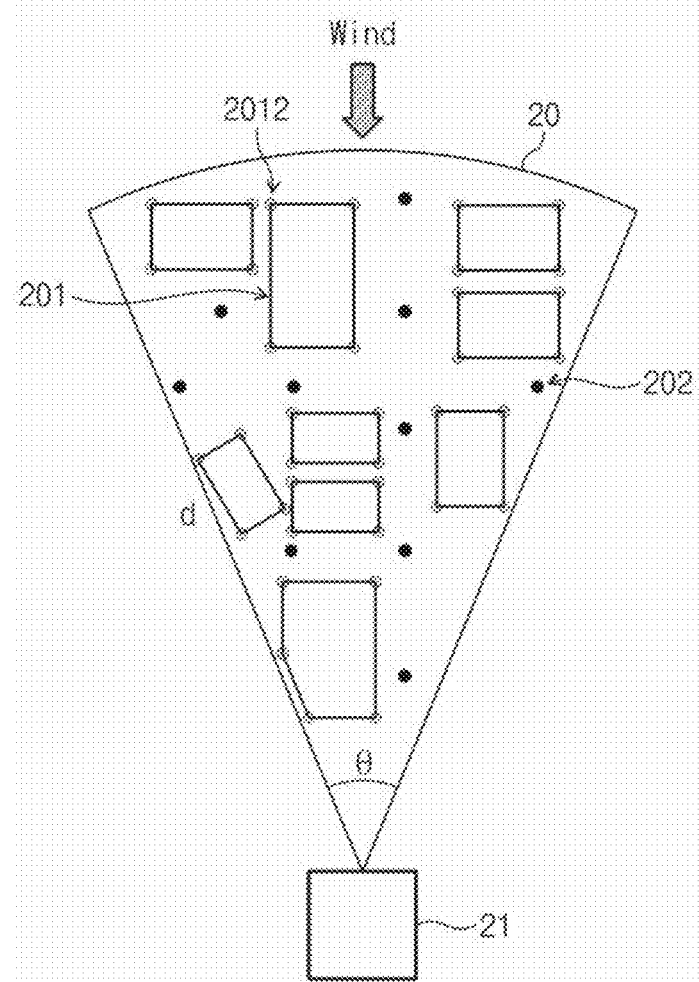
FIG. 10 is an exemplary view illustrating joints obtained from an outline of a building included in the region according to another embodiment of the present invention.

According to another embodiment of the present invention, the sample point height information collecting unit 111 may extract joints from outlines of the extracted buildings, and allocated the extracted joints as the sample points FIG. 10 is an exemplary view illustrating joints obtained from the outline of the building 201 included in the region 20 according to an embodiment of the present invention.

As shown in FIG. 10, the sample point height information collecting unit 111 may extract joints 2012 from the outlines of the extracted buildings 201 from the digital map of the region 20 and allocated the extracted joints as the sample points. According to an embodiment, the joints 2012 may correspond to corners of a polygonal configured with the outlines of the buildings 201.

In such a way, the sample point height information collecting unit 111 may extract the buildings 201 and elevation points 202 from the digital map of the region 20, and allocate the sample points to the extracted buildings 201 and the elevation points 202. The sample points may be allocated to the centers 2011 of the buildings 201, the joints 2012 obtained from the outlines of the buildings 201, or both the centers of the buildings 201 and the joints.

According to an embodiment, when the sample points positioned at the buildings 201, the sample point height information collecting unit 111 may calculate the heights of the corresponding buildings as the heights of the sample points. In this embodiment, the sample point height information collecting unit 111 may collect information about the numbers of floors of the buildings 201 at which the sample points are positioned, and calculate the heights of the corresponding buildings by multiplying the collected number of building floors by a preset height. The height multiplied to the number of building floors may be 3 m, but is not limited hereto and may be higher or lower than 3 m.

According to an embodiment of the present invention, when a sample point is positioned on the ground surface or water surface, the sample point height information collecting unit 111 may calculate the height of the corresponding sample point as 0. In other words, when the sample point is positioned at the ground surface or water surface like the ground, a river, a lake, or the sea, but not at a building, the height of the sample point may be calculated as 0.

Figure 11:
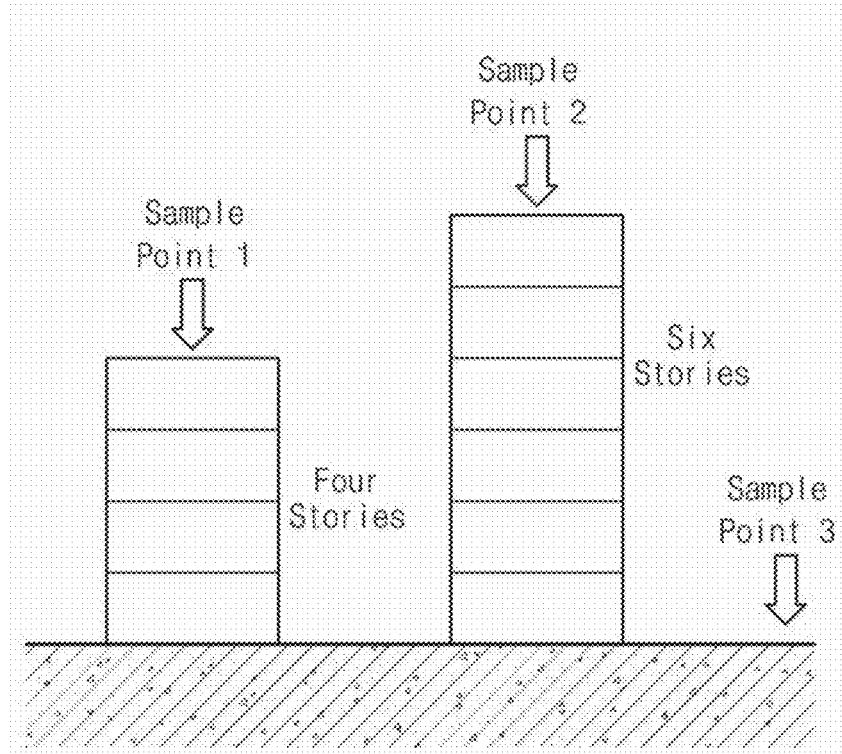
FIG. 11 is an exemplary view illustrating a process of calculating height information for a plurality of sample points in the region according to another embodiment of the present invention.

FIG. 11 is an exemplary view illustrating a process of calculating height information for a plurality of sample points in a region 20 according to an embodiment of the present invention.

As shown in FIG. 11, when a sample point 1 among the plurality of sample points in the region 20 is positioned at a building, the sample point height information collecting unit 111 may collect information about the number of building floors. In FIG. 5, the number of floors of the building at which the sample point 1 is positioned is 4. The sample point height information collecting unit 111 may calculate height information for the corresponding sample point by multiplying the number of building floors by a preset height (e.g., 3 m). In this case, the height of the sample point 1 shown in FIG. 11 may be calculated as 12 m. Similarly, the height of a sample point 2 may be calculated as 18 m.

Furthermore, as illustrated in FIG. 11, when a sample point 3 among the plurality of sample points in the region 20 is positioned on the ground surface, the sample point height information collecting unit may calculate the height of the corresponding sample as 0.

As described above, according to an embodiment of the present invention, although collecting height information for the sample points by using the digital map of the region 20, the sample point height information collecting unit 111 may also collect it by using data for the region 20, which are measured by using at least one of ground survey, GPS measurement, aerial photogrammetry, radargrammetry, and LiDAR measurement.

According to an embodiment, the sample point height information collecting unit 111 may extract building and ground surface data through filtering from 3-dimensional dot data collected by using at least one of ground survey, GPS measurement, aerial photogrammetry, radargrammetry, and LiDAR measurement for the region, generate the sample points corresponding to the extracted buildings and ground data. In addition, the sample point height information collecting unit 111 may calculate the heights of the sample points positioned at the buildings as the heights of the buildings and the heights of the points positioned on the ground surface as 0.

Referring to FIG. 7 again, the target point height information obtaining unit 112 may obtain height information for a plurality of target points in the region by using height information for the sample points. Here, the target points are points considered to calculate parameters used for calculating a wind load in the region, and the parameters may be calculated on the basis of height information for the target points according to an embodiment of the present invention.

According an embodiment of the present invention, the target point height information obtaining unit 112 may generate a digital elevation model (DEM) by using height information for the collected sample points. Then, a plurality of target points corresponding to grid vertices of the DEM are generated and heights of the grid vertices of the DEM may be calculated as height information for the target points corresponding to the grid vertices.

According to an embodiment of the present invention, the target point height information obtaining unit 112 may allocate one point in the DEM grid as a target point. For example, the target point height information obtaining unit 112 may allocate the center of the DEM grid as the target point.

According to another embodiment of the present invention, the target point height information obtaining unit 112 may generate a plurality of target points in the region (e.g., see FIG. 2), and calculate height information for the target points by using interpolation based on the height information for the collected sample points.

According to an embodiment, in order to calculate the height information for the target points, the target point height information obtaining unit 112 may use linear interpolation, nonlinear interpolation, or natural neighbor interpolation, but the interpolation is not limited hereto.

Figure 12:
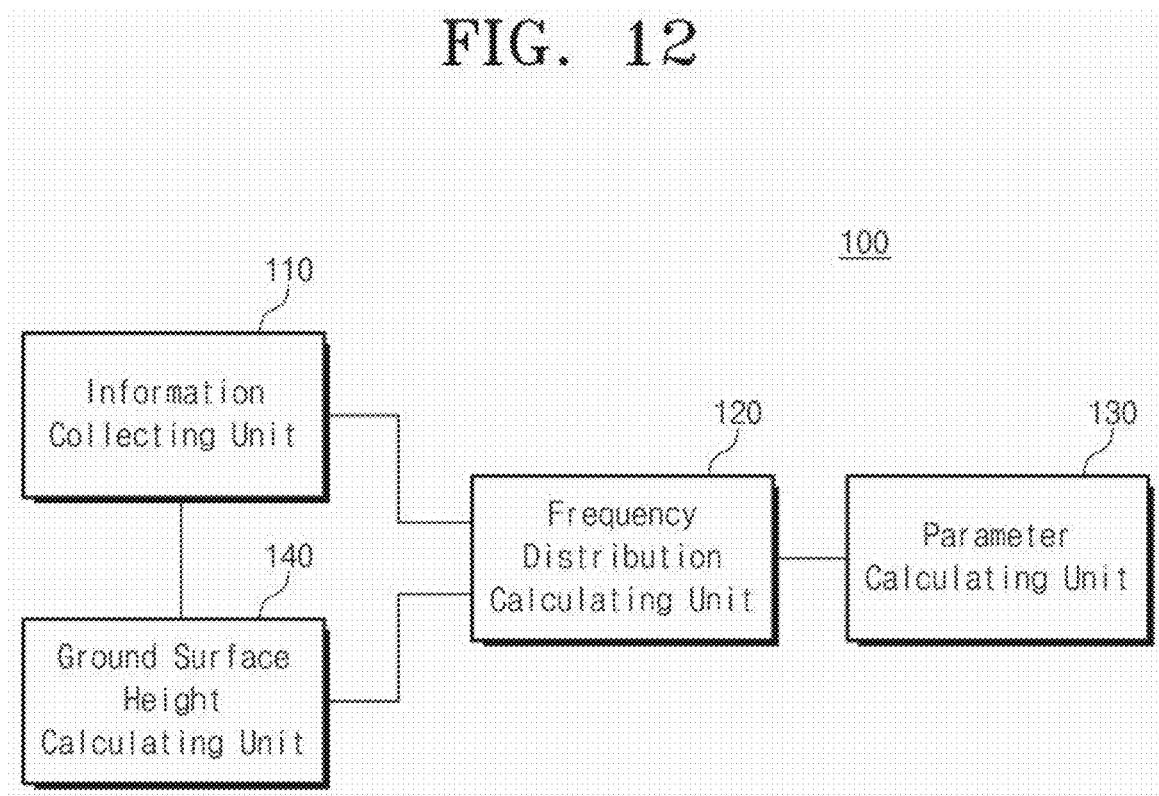
FIG. 12 is an exemplary block diagram illustrating a wind load calculating apparatus according to another embodiment of the present invention.

FIG. 12 is an exemplary block diagram illustrating a wind load calculating apparatus 100 according to another embodiment of the present invention.

Referring to FIG. 12, the information collecting unit 110 may collect elevation information and overall height information that the height of the building is reflected in the elevation for a plurality of points in the region 20. Furthermore, the wind load calculating apparatus 100 may further include a ground surface calculating unit 140 calculating a ground surface height of the region 20 on the basis of the elevation information. In addition, the frequency distribution calculating unit 120 may calculate a frequency distribution for a difference value between a total height calculated for each point and the ground surface height.

When a point is positioned at a building, the information obtaining unit 110 may calculate an overall height of the corresponding point by summing the elevation of the ground surface and the height of the building. Furthermore, when the point is positioned on the ground surface or water surface, the information obtaining unit 110 may calculate the elevation of the ground surface or water surface as an overall height of the corresponding point.

Figure 13:
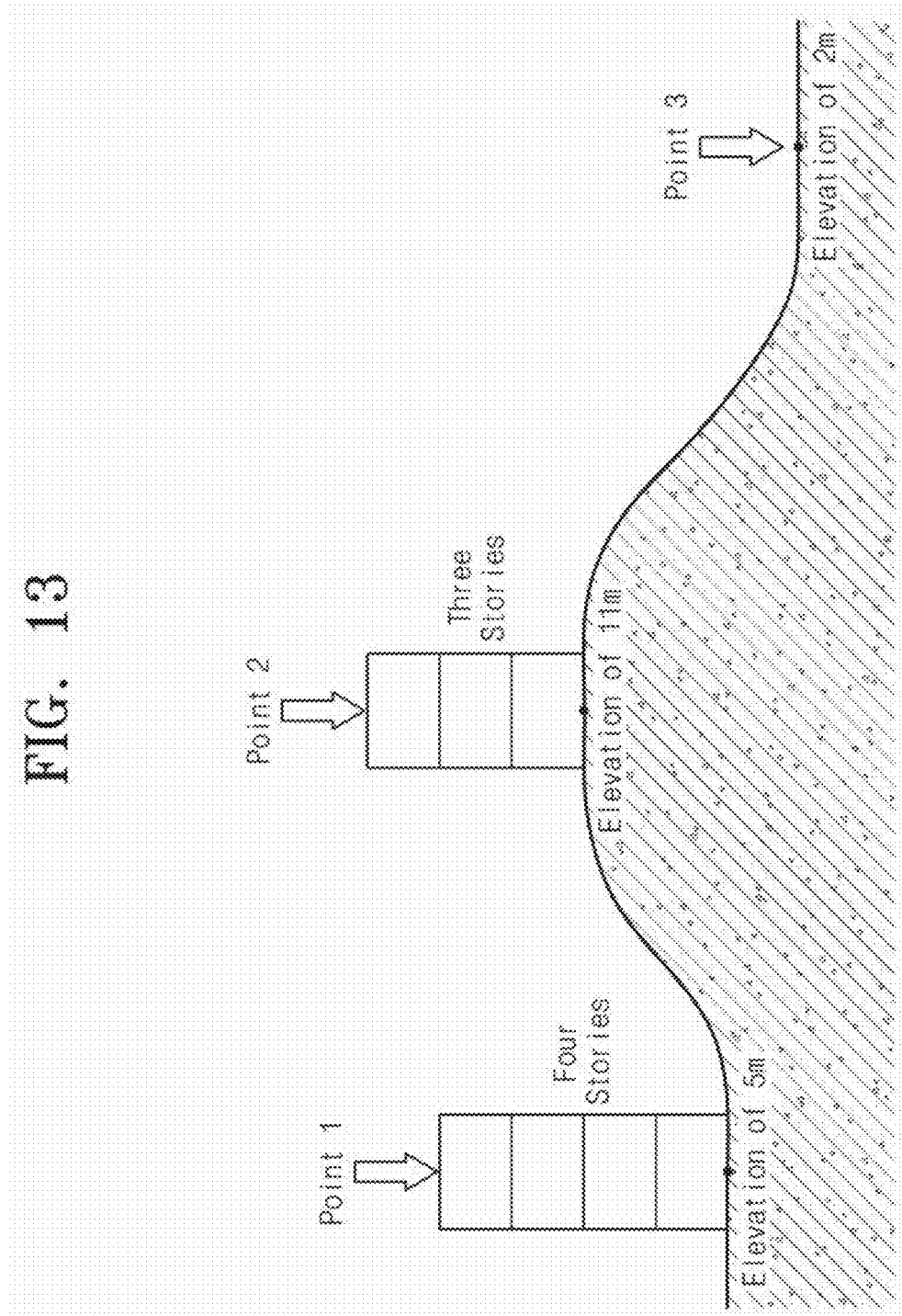
FIG. 13 is an exemplary view illustrating a process of obtaining elevation information for a plurality of points and overall height information according to another embodiment of the present invention.

FIG. 13 is an exemplary view for explaining a process of obtaining elevation information and overall height information for a plurality of points according to an embodiment of the present invention.

Referring to FIG. 13, since a point 1 is positioned at a building, an overall height of the point 1 may be calculated as 17 m by multiplying the number 4 of building floors by 3 m and adding the elevation 5 m of the ground surface to the multiplied result 12 m.

Similarly, since a point 2 is positioned at the building, an overall height of the point 2 may be calculated as 20 m by multiplying the number 3 of building floors by 3 m and adding the elevation 11 m of the ground surface to the multiplied result 9 m.

On the contrary, since a point 3 is positioned on the ground surface, not at a building, an overall height of the point 3 may be calculated as 2 m, which is the elevation of the ground surface.

The ground surface height calculating unit 140 may calculate the height of the elevation of the region 20 on the basis of elevation information for the plurality of points.

According to an embodiment of the present invention, the ground surface height calculating unit 140 may calculate, as the ground surface height, a minimum value or a maximum frequency of the elevations of the plurality of points.

Figure 14:
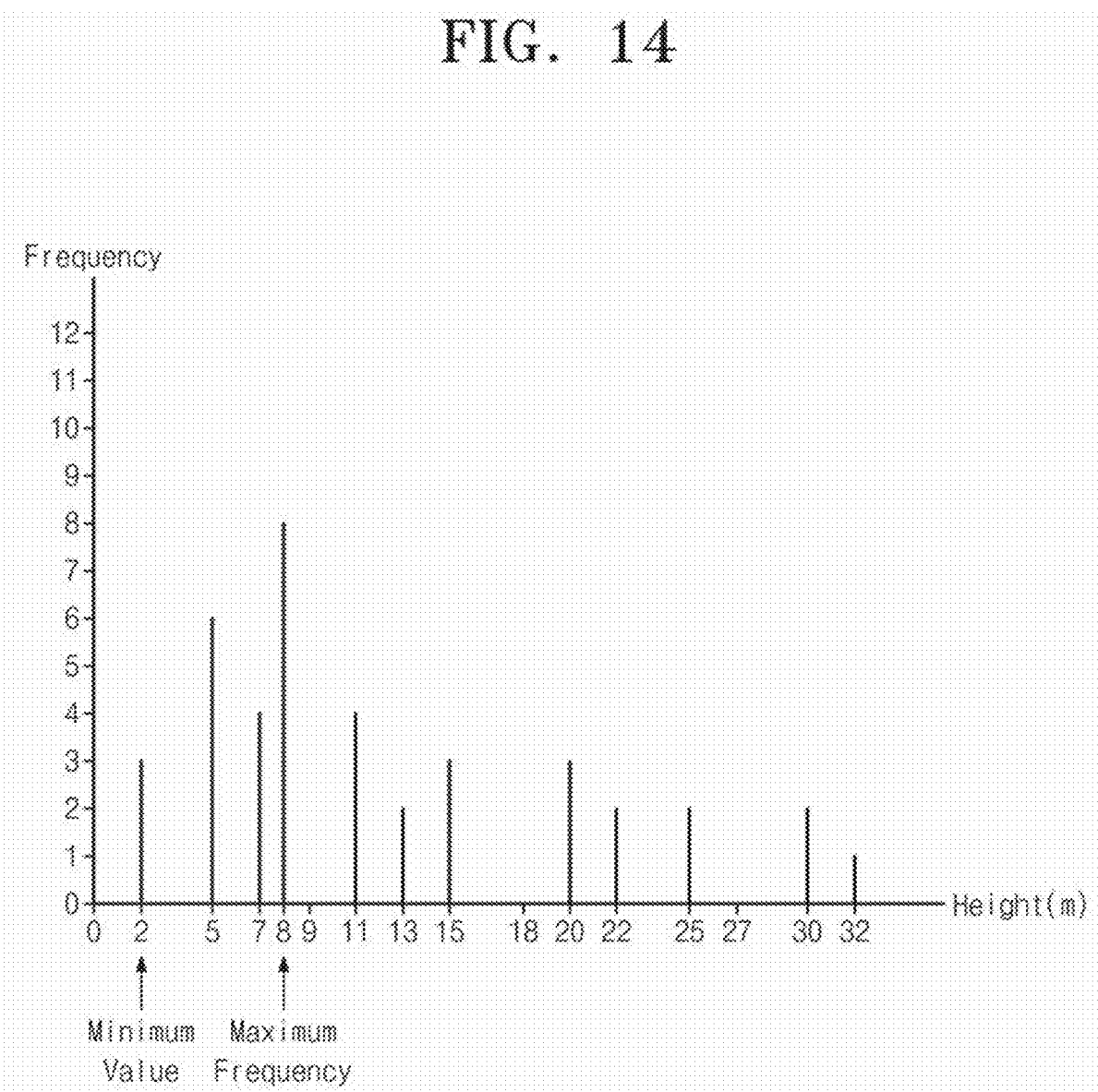
FIG. 14 is an exemplary graph sequentially enumerating elevations of a plurality of points in a region according to another embodiment of the present invention.

FIG. 14 is an exemplary graph sequentially enumerating elevations of a plurality of points in the region 20 according to an embodiment of the present invention.

According to an embodiment shown in FIG. 14, a minimum value is 2 m, and a maximum frequency is 8 m among the elevations of the plurality of points collected for the region 20. According to an embodiment, the ground surface height calculating unit 140 may calculate, as the ground surface height of the region 20, 2 m corresponding to the minimum value among the elevations of the plurality of points. According to another embodiment, the ground surface calculating unit 140 may calculate, as the ground surface height of the region 20, 8 m corresponding to the maximum frequency among the elevations of the plurality of points.

According to another embodiment, the ground surface height calculating unit 140 may calculate a frequency distribution for the elevations of the plurality of points and calculate, as the ground surface height of the region 20, a value of a rank having a maximum frequency in the frequency distribution.

Figure 15:
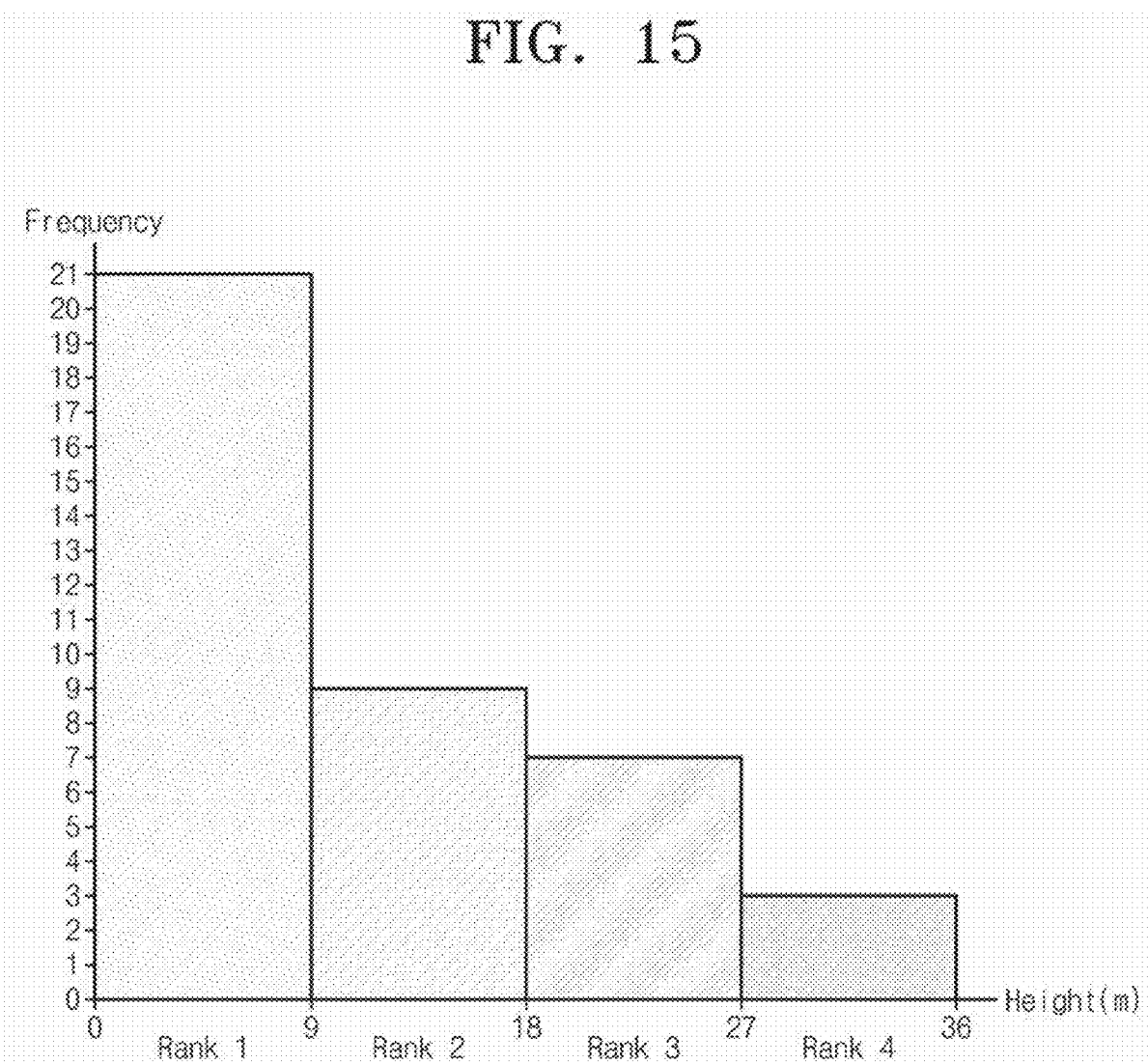
FIG. 15 is an exemplary frequency distribution diagram illustrating a frequency distribution for elevations of a plurality of points in a region according to another embodiment of the present invention.

FIG. 15 is an exemplary frequency distribution diagram representing a frequency distribution for the elevations of the plurality of points in the region 20 according to an embodiment of the present invention.

Referring to FIG. 15, the ground surface height calculating unit 140 may calculate, as the ground surface height of the region 20, a rank value 4.5 m of rank 1 having a maximum frequency in a frequency distribution for the elevations of the plurality of points.

According to an embodiment, the ground surface height calculating unit 140 may calculate, as the ground surface height of the region 20, an average value of the elevations belonging to a rank having the maximum frequency. For example, in the embodiment of FIG. 15, the ground surface height calculating unit 140 may calculate an average value of the elevations belonging to rank 1 having the maximum frequency to determine the average value as the ground surface height of the region 20.

According to an embodiment, the ground surface height calculating unit 140 may calculate, as the ground surface height of the region 20, an average value of the elevations belonging to the lowest rank in the frequency distribution.

Here, the average value may be an arithmetic average value or a geometric mean value of the elevations, or may be a weighted average value that frequencies of the elevations are applied as weights to the elevations according to an embodiment.

In the frequency distribution diagram shown in FIG. 15, although a rank size is set as 9 m, the rank size is not limited hereto and set greater or smaller than 9 m. Furthermore, in the frequency distribution shown in FIG. 6, although rank sizes are identically set, the sizes of the ranks forming the frequency distribution may be set differently from each other according to an embodiment.

Then, the frequency distribution calculating unit 120 may calculate a difference value between the overall height and the ground surface height for each of the plurality of points and calculate the frequency distribution for the difference values.

According to another embodiment, the information collecting unit 110 may further collect position information for the plurality of points in the region 20. In addition, the ground surface height calculating unit 140 may calculate a regression equation by using a regression analysis on the basis of the position and elevation information for the points and calculate the ground surface height for each point by substituting the position information for the points in the regression equation.

Here, the position information for the points may include an absolute coordinate including latitudinal and longitudinal data of the points, but include a relative coordinate with an arbitrary reference point according to an embodiment. The position information for the points may be collected from the digital map or from data obtained by measuring the region 20 according to an embodiment.

Figure 16:
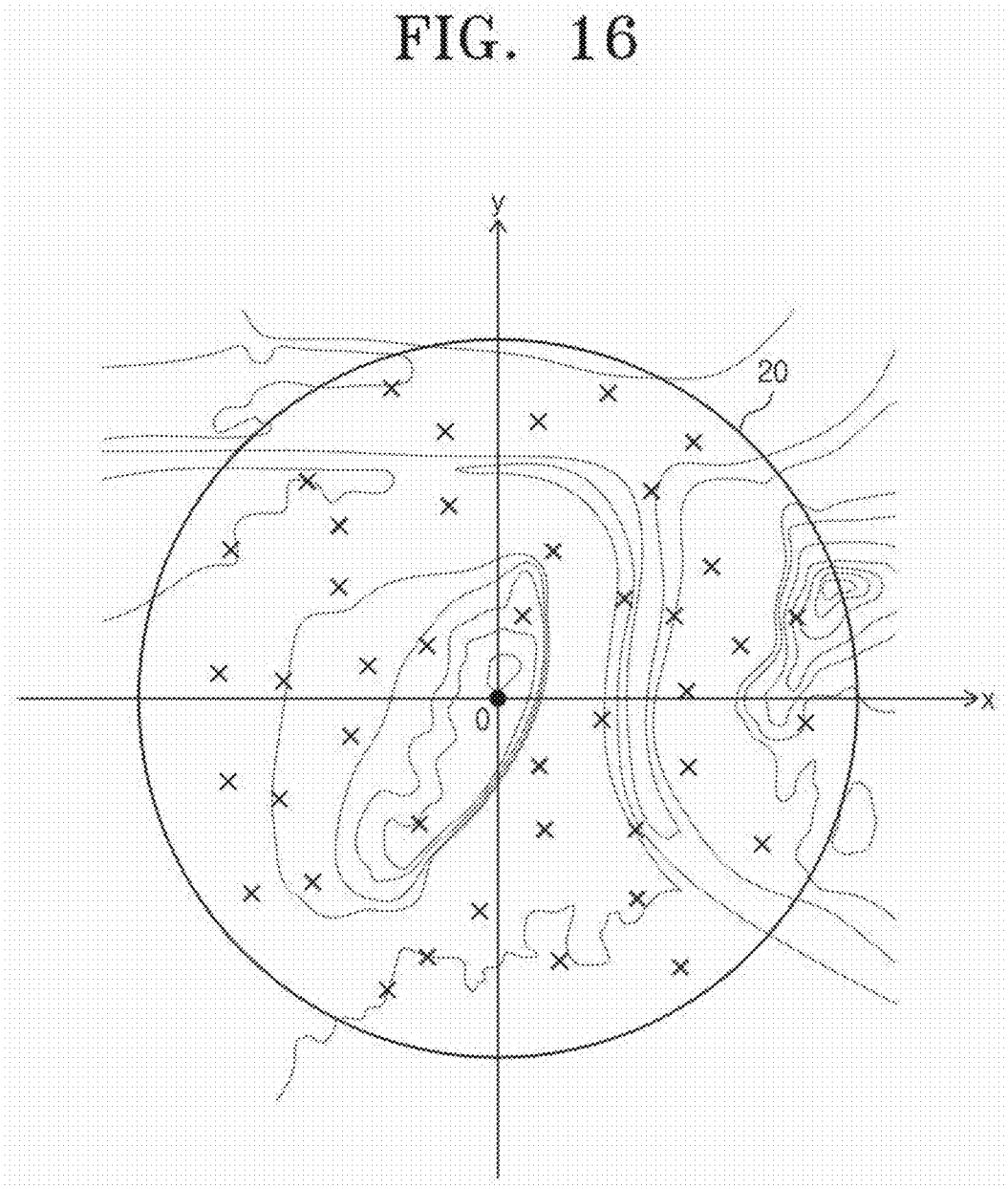
FIG. 16 is an exemplary view for explaining a process of obtaining position information for a plurality of points according to another embodiment of the present invention.

FIG. 16 is an exemplary view for explaining a process of obtaining position information for a plurality of points X according to another embodiment.

As shown in FIG. 16, positions of the plurality of points X may be represented with 2-dimensional rectangular coordinate having the center 21 of the region 20 as an original point. In this case, the coordinates (x, y) of the plurality of points X may be determined according to a distance and a direction from the original point.

Although the original point of the coordinate system is set as the center 21 in FIG. 16, the position of the original point is not limited hereto and may be set as an arbitrary point positioned inside or outside the region 20.

The ground surface height calculating unit 140 may calculate a regression equation by using regression analysis on the basis of the position and elevation information of the points.

According to an embodiment of the present invention, the ground surface height calculating unit 140 may calculate a regression equation on the basis of the position and elevation information for some of the plurality of points. In other words, the ground surface height calculating unit 140 may perform regression analysis only for some of the plurality of points.

According to an embodiment, the ground surface height calculating unit 140 may calculate the regression equation on the basis of the position and elevation information for points corresponding to the pre-determined number or ratio of the plurality of points.

According to another embodiment, the ground surface height calculating unit 140 may select points to be used for the regression analysis from among the plurality of points by using the frequency distribution.

For example, the ground surface height calculating unit 140 may calculate a frequency distribution for the elevations of the plurality of points, select points having elevations belonging to a rank having a maximum frequency in the frequency distribution, and calculate a regression equation on the basis of the position and elevation information for the selected points.

According to another embodiment, the ground surface height calculating unit 140 may select points having elevations belonging the lowest rank in the frequency distribution, and calculate a regression equation on the basis of the position and elevation information for the selected points.

The ground surface height calculating unit 140 may calculate the regression equation by setting the position information for the points as an independent variable, and the elevation information of the points as a dependent variable.

Figure 17:
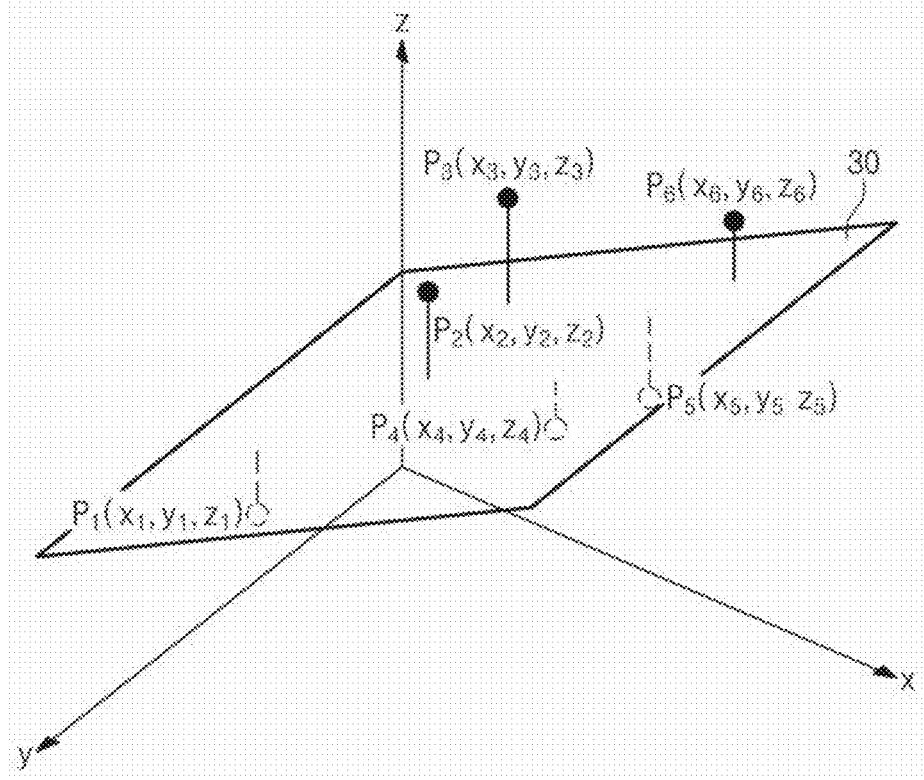
FIG. 17 is an exemplary view illustrating a process of calculating a regression equation on the basis of position information and elevation information for points according to another embodiment of the present invention.

FIG. 17 is an exemplary view for explaining a process of calculating a regression equation on the basis of position and elevation information of points according to another embodiment.

As shown in FIG. 17, according to an embodiment of the present invention, the ground surface height calculating unit 140 may calculate the following regression equation by regressively analyzing position and elevation information (x, z) for points $P_1$ to $P_6$:

$$z_i = a_0 + a_1 x_i + a_2 y_i + e_i \tag{1}$$

The regression equation may be an equation representing a plane 30 shown in FIG. 17.

According to an embodiment, the ground surface height calculating unit 140 may calculate $a_0$, $a_1$, $a_2$ allowing a sum of square of an error $e_i$ to be minimized:

$$S_r = \sum_{i=1}^{n} (z_i - a_0 - a_1 x_1 - a_2 y_i)^2 \tag{2}$$

For this, the ground surface height calculating unit 140 may obtain a simultaneous equation by calculating partial derivative of $S_r$ with respect to the unknowns $a_0$, $a_1$, $a_2$:

$$\frac{\partial S_r}{\partial a_0} = -2 \sum (z_i - a_0 - a_1 x_1 - a_2 y_i) = 0 \tag{2}$$

$$\frac{\partial S_r}{\partial a_1} = -2 \sum x_i (z_i - a_0 - a_1 x_1 - a_2 y_i) = 0$$

$$\frac{\partial S_r}{\partial a_2} = -2 \sum y_i (z_i - a_0 - a_1 x_1 - a_2 y_i) = 0$$

Then, $a_0$, $a_1$, $a_2$ may be calculated by solving the simultaneous solution.

For example, when the position and elevation information (x, y, z) for the points $P_1$ to $P_6$ are given as $P_1(0, 0, 5)$, $P_2(2, 1, 10)$, $P_3(2.5, 2, 9)$, $P_4(1, 3, 0)$, $P_5(4, 6, 3)$, and $P_6(7, 2, 27)$, $a_0=5$, $a_1=4$, $a_3=-3$ are calculated.

Accordingly, a plane equation obtained by regressively analyzing the points $P_1$ to $P_6$ is as follows:

$$z = 5 + 4x - 3y \tag{3}$$

In such a way, the ground surface height calculating unit 140 may set the position information (x, y) for the points $P_1$ to $P_6$ as independent variables and the elevation information (z) as a dependent variable to calculate the regression equation. The calculated regression equation may be used for calculating the ground surface height for each of the plurality of points as described later.

Then, the ground surface height calculating unit 140 may substitute the position information (x, y) for the points in the regression equation to calculate the ground surface height for each of the plurality of the points.

Figure 18:
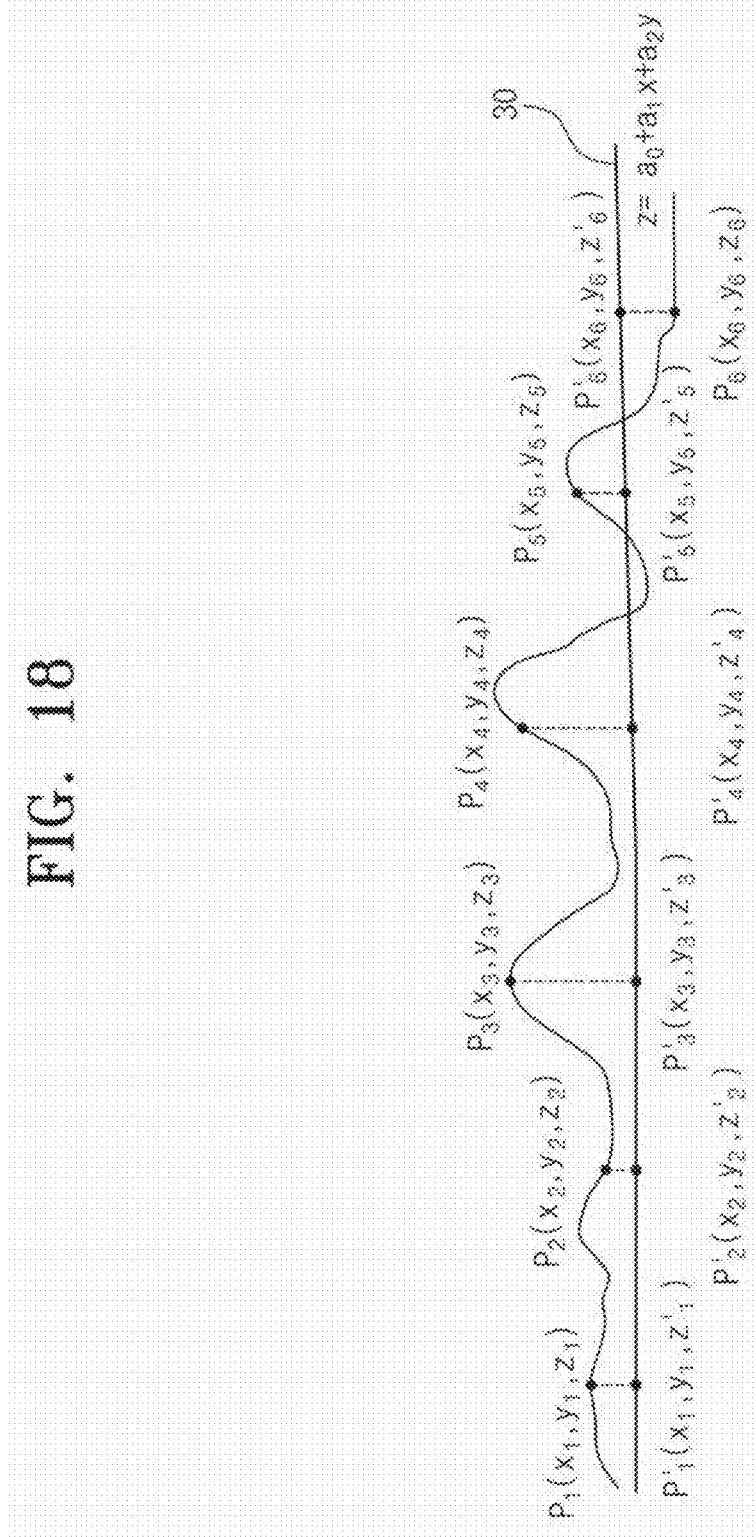
FIG. 18 is an exemplary view illustrating a process of calculating a ground level of each point by using a regression equation according to another embodiment of the present invention.

FIG. 18 is an exemplary view for explaining a process of calculating the ground surface height of each of the plurality of points by using the regression equation according to another embodiment of the present invention.

According to an embodiment, the regression equation calculated on the basis of the position and elevation information for some points may be considered as the ground surface of the region 20, and accordingly the ground surface height calculating unit 140 may obtain the ground surface height of each of the plurality of points by substituting each piece of the position information for the plurality of points in the regression equation.

For example, as shown in FIG. 18, the ground surface height calculating unit 140 may substitute the position information (x, y) for each point in a regression equation $z_i=a_0+a_1x+a_2y$. Since an embodiment of the present invention considers that the plane 30 represented by the regression equation corresponds to the ground surface of the region 20, a height z obtained by substituting the position information (x, y) for each the points $P_1$ to $P_6$ may correspond to the ground surface height of each point.

In embodiments shown in FIGS. 17 and 18, the ground surface height of each point is calculated by using the regression equation representing the plane 30. However, the ground surface height of each point may also be calculated by calculating the regression equation representing a curved surface instead of the plane according to an embodiment.

Figure 19:
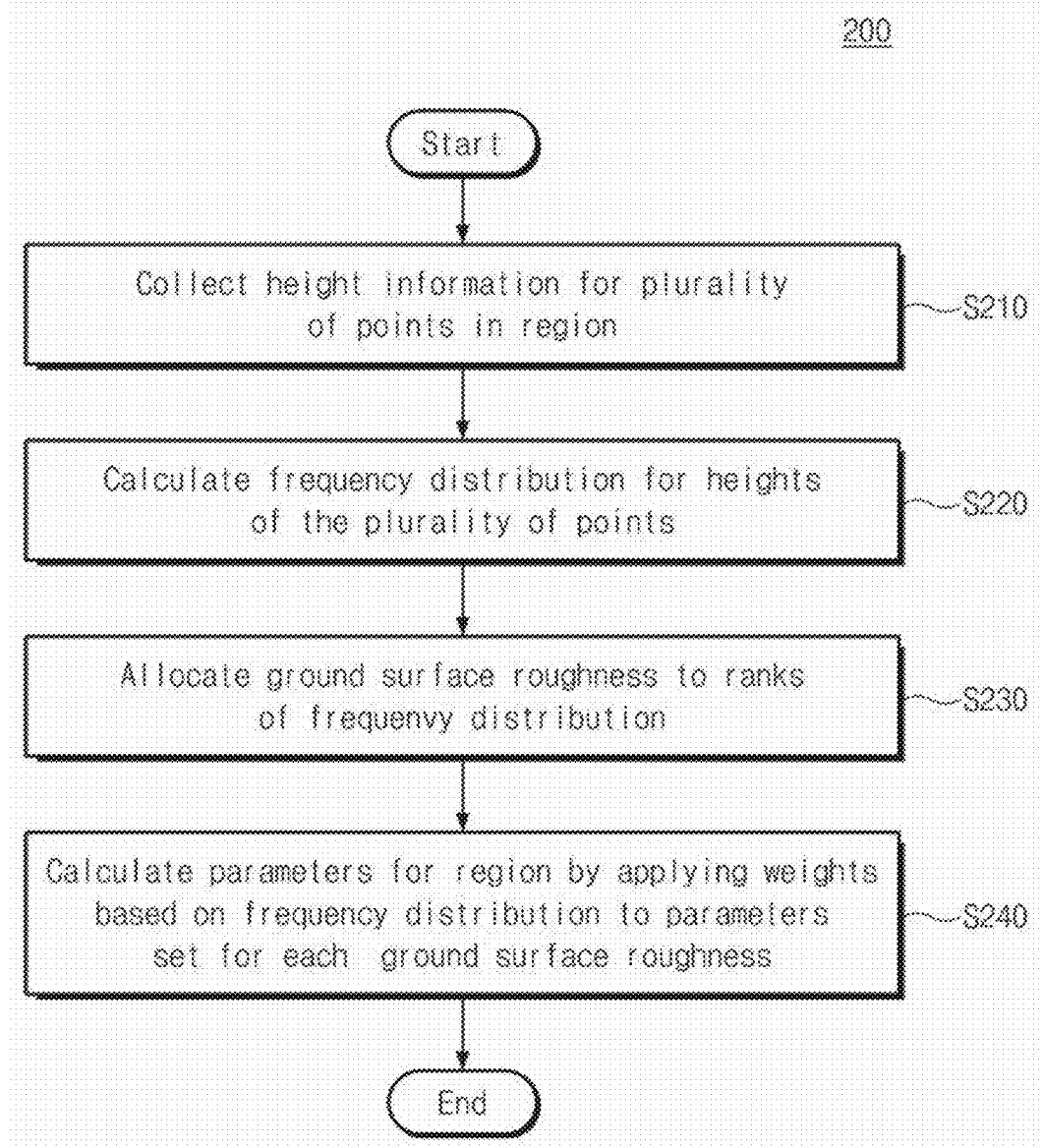
FIG. 19 is a flow chart illustrating a wind load calculating method according to another embodiment of the present invention.

FIG. 19 is a flowchart illustrating a wind load calculating method according to an embodiment of the present invention.

According to the wind load calculating method according to the embodiment of the present invention may calculate parameters for the region by applying weights to parameters set for each ground surface roughness on the basis of a frequency distribution for heights of a plurality of points in the region. The wind load calculating method may be executed by the wind load calculating apparatus 100 according to an embodiment of the present invention.

As shown in FIG. 19, the wind load calculating method 200 may include collecting height information for a plurality of points in a region (operation S210), calculating a frequency distribution for heights of the plurality of points (operation S220), allocating ground surface roughness to ranks of the frequency distribution (operation S230), and calculating parameters for the region by applying weights based on the frequency distribution to parameters set for each ground surface roughness (operation S240).

According to an embodiment, the collecting of the height information (operation S210) may include collecting the height information from a digital map including information for the region 20. The data for the digital map may be stored in a storage unit prepared in the wind load calculating apparatus 100, an external storage device connected to the wind load calculating apparatus 100, or a server connected to the wind load calculating apparatus 100 over a network.

According to an embodiment, the collecting of the height information (operation S210) may include collecting the height information for the plurality of points from data measured for the region 20 by using at least one of ground survey, GPS measurement, aerial photogrammetry, radargrammetry, and LiDAR measurement.

According to an embodiment, the plurality of point in the region 20 may correspond to buildings positioned in the region. According to an embodiment, in the collecting of the height information (operation S210), when one point in the region 20 is positioned in the building, the height of the building may be calculated as height information for the point.

On the contrary, some of the plurality of points in the region 20 may correspond to the ground surface or water surface on which a building is not positioned. According to an embodiment, in the collecting of the height information (operation S210), when one point in the region 20 is not positioned on the ground surface or water surface, the height of the point may be calculated as 0.

According to an embodiment, the collecting of the height information (operation S210) may include extracting buildings, elevations and reference points from a digital map for the region, generating points having one-to-one correspondence with joints obtained by extracting the centers or outlines of the buildings, and elevation points and reference points positioned on the ground surface, and calculating the height of the points positioned at the buildings as the heights of the buildings and the heights of the points positioned on the ground surface as 0.

According to an embodiment, the height of the building may be calculated by multiplying the number of building floors by a preset height. The preset height multiplied to the number of building floors may be 3 m, but is not limited hereto and may be greater or smaller than 3 m.

According to an embodiment, the collecting of the height information (operation S210) may include extracting building and ground surface data through filtering 3-dimensional data collected by using at least one of ground survey, GPS measurement, aerial photogrammetry, radargrammetry, and LiDAR measurement for the region, generating points having one-to-one correspondence with the extracted buildings and ground surface data, and calculating the height of the points positioned at the buildings as the heights of the buildings and the heights of the points positioned on the ground surface as 0.

The calculating of the frequency distribution (operation S220) is to calculate the frequency distribution for the heights of the plurality of points. For example, in the calculating of the frequency distribution (operation S220), the heights of the plurality of points are divided into a plurality of ranks and then a frequency of points belonging to each rank is calculated and arranged as the frequency distribution.

According to an embodiment, the number of the ranks may correspond to the number of ranks of the ground surface roughness. For example, when the ground surface roughness is divided into 4 ranks, the calculating of the frequency distribution (operation S220) may include calculating the frequency distribution that the heights of the plurality of points are arranged into 4 ranks.

According to an embodiment, the allocating of the ground surface roughness (operation S230) may include allocating the ground surface roughness according to the sizes of the ranks. For example, in the allocating of the ground surface roughness (operation S230), the larger the rank size is, the greater the ground surface roughness may be allocated.

According to an embodiment, the calculating of the parameters for the region (operation S240) may include calculating a relative frequency for each rank which forms the frequency distribution, and summing values obtained by multiplying parameter values set for each ground surface roughness by the relative frequency.

As described in relation to FIG. 6, parameters necessary for calculating a wind load, such as velocity pressure exposure coefficient ($K_{zr}$), topographic factor ($K_{zt}$), turbulence intensity ($I_z$), power law exponent ($\alpha$), reference gradient height ($Z_g$), and planetary boundary layer bottom height ($Z_b$), are set differently for each ground roughness.

According to an embodiment, instead of uniformly determining parameter values for the region 20 for each ground surface roughness, reasonable and objective numerals, which are proper to the region 20, may be provided by using information for heights of the plurality of points in the region 20. According to an embodiment, final parameters for the region 20 may be calculated by allocating the ground surface roughness for each rank of the frequency distribution, multiplying parameter values set for each ground surface roughness by a relative frequency of each rank as a weight, and summing the multiplied results.

According to another embodiment, the collecting of the height information (operation S210) for the points may include collecting height information for a plurality of sample points in the region 20, and obtaining height information for a plurality of target points in the region 20 by using the height information for the sample points.

For example, the obtaining of the height information for the target points may include generating a DEM by using the height information for the collected sample points, generating a plurality of target points corresponding to grid vertices of the DEM, and calculating the heights of the grid vertices of the DEM as height information for the target points corresponding to the grid vertices.

For another example, the obtaining of the height information for the target points may include generating a plurality of target points in the region 20, and calculating the height information for the target points by using interpolation based on the height information for the collected sample points.

According to another embodiment, the collecting of the height information (operation S210) for the points may include collecting elevation information and overall height information that the height of the building is reflected in elevation for the plurality of points in the region 20.

Furthermore, the wind load calculating method 200 may further include calculating the height of the ground surface of the region 20 on the basis of the elevation information.

The calculating of the frequency distribution (operation S220) may include calculating a frequency distribution for a difference value between the overall height calculated for each point and the ground surface height.

According the present embodiment, when the point is positioned at a building, the overall height for the corresponding point may be calculated by summing the height of the building and the elevation of the ground surface. Furthermore, when the point is positioned on the ground surface or water surface, the overall height of the corresponding point may be calculated as the elevation of the ground surface or water surface.

According to an embodiment, the calculating of the height of the ground surface may include calculating a minimum value or a maximum frequency of the elevations for the plurality of points as the ground surface height. According to an embodiment, in the calculating of the ground surface height, a frequency distribution for the elevations of the plurality of points is calculated, and, as the ground surface height, a value of a rank having a maximum frequency in the frequency distribution, an average value of the elevations belonging to a rank having a maximum frequency in the frequency distribution, a value of the lowest rank in the frequency distribution, or an average value of the elevations belonging to the lowest rank in the frequency distribution may be calculated.

According to another embodiment, the collecting of the height information (operation S210) for the points may further include collecting position information for the plurality of points in the region 20.

Furthermore, the calculating of the ground surface height may include calculating a regression equation by using regressive analysis based on the position and elevation information, and substituting the position information for the points in the regression equation to calculate the ground surface height of each of the points.

Here, the position information (x, y) may be set as independent variables, and the elevation information (z) may be set a dependent variable of the regression equation.

According to an embodiment, the calculating of the regression equation may include calculating a regression equation based on position and elevation information for some of the plurality of points.

As an example, the calculating of the regression equation may include calculating a frequency distribution for the elevations of the plurality of points, selecting points having elevations belonging to a rank having a maximum frequency or the lowest rank in the frequency distribution, and calculating a regression equation on the basis of the position and elevation information for the selected points.

The above described wind load calculating method 200 can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storages.

In the above, a wind load calculating apparatus and method are described which calculate a frequency distribution for the heights of a plurality of points in a region, applying weights to parameter values set for each ground surface roughness on the basis of the frequency distribution to calculate parameters for the region, and calculate the wind load for the region by using the calculated parameters.

According to the wind load calculating apparatus and method, parameters proper to a corresponding region and a wind load can be calculated on the basis of objective information for the region instead of using parameters uniformly set for each ground surface roughness. In addition, it can be prevented that a wind load is improperly calculated with ground surface roughness which is determined subjectively by a designer and safety and economic feasibility of a structure are lowered.

According to embodiments of the present invention, parameters can be prevented from being improperly determined, which are used for calculating a wind load with ground surface roughness which is determined subjectively by a designer.

In addition, according to embodiments of the present invention, the parameters and the wind load can be objectively and reasonably calculated on the basis of objective information about a region that is considered in calculating the wind load.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An apparatus for calculating a wind load, comprising:
an information collecting unit collecting heights of a plurality of points in a region;
a frequency distribution calculating unit calculating a frequency distribution for the heights of the plurality of points; and
a parameter calculating unit allocating ground surface roughness for ranks in the frequency distribution and calculating parameters for the region by applying weights on the basis of the frequency distribution to parameters set for each ground surface roughness for calculating the wind load, wherein the parameter calculating unit allocates the ground surface roughness according to a rank size, and wherein the parameter calculating unit calculates a relative frequency for each rank and multiplies a parameter set for each ground surface roughness by the relative frequency to sum the multiplied results.

2. The apparatus of claim 1, wherein the information collecting unit calculates a height of a building as height information of a point, when the point is positioned at the building, and calculates the height information for the point as 0, when the point is positioned on a ground surface or water surface.

3. The apparatus of claim 1, wherein the plurality of points are uniformly distributed in the region.

4. The apparatus of claim 1, wherein the plurality of points have one-to-one correspondence with buildings in the region.

5. The apparatus of claim 1, wherein the parameters comprises at least one of a velocity pressure exposure coefficient, a topographic factor, a turbulence intensity, a power law exponent, a reference gradient height, and a planetary boundary layer bottom height.

6. The apparatus of claim 1, wherein the information collecting unit comprises:
a sample point information collecting unit collecting height information for a plurality of sample points in the region; and
a target point information obtaining unit obtaining height information for a plurality of target points in the region by using the height information for the plurality of sample points.

7. The apparatus of claim 6, wherein the target point information obtaining unit generates a digital elevation model (DEM) by using the height information for the collected sample points, generates a plurality of target points corresponding to grid vertices of the DEM, and calculates height values of the grid vertices of the DEM as the height information for the target points corresponding to the grid vertices.

8. The apparatus of claim 6, wherein the target point information obtaining unit generates a plurality of target points in the region and calculates the height information for the target points by using an interpolation based on the height information for the collected sample points.

9. The apparatus of claim 1, wherein the information collecting unit collects information on elevations of the plurality of points in the region, and overall height information that building heights are reflected in the elevations; a ground surface height calculating unit is further comprised which calculates a ground surface height of the region on the basis of the elevation information; and the frequency distribution calculating unit calculates the frequency distribution for a difference value between the overall height information calculated for each of the plurality of points and the ground surface height.

10. The apparatus of claim 9, wherein the information collecting unit calculates as the overall height information for a corresponding point by summing a height of a building and an elevation of the ground surface, when the point is positioned at the building, and calculates the overall height information for the corresponding point as an elevation of the ground surface or water surface, when the point is positioned on the ground surface or the water surface.

11. The apparatus of claim 9, wherein the ground surface height calculating unit calculates a minimum value or a maximum frequency of elevations of the plurality of points.

12. The apparatus of claim 9, wherein the ground surface height calculating unit calculates the frequency distribution for the elevations of the plurality of points and calculates, as the ground surface height, a value of a rank having a maximum frequency, an average value of elevations belonging to a rank having the maximum frequency, a value of the lowest rank, or an average value of elevations belonging to the lowest rank in the frequency distribution.

13. The apparatus of claim 9, wherein the information collecting unit further collects position information for the plurality of points in the region, and the ground surface height calculating unit calculates a regression equation by using a regression analysis based on the position and elevation information, and substituting the position information in the regression equation to calculate the ground surface height of each of the plurality of points.

14. The apparatus of claim 13, wherein the ground surface height calculating unit sets the position information as an independent variable and the elevation information as a dependent variable to calculate the regression equation.

15. The apparatus of claim 13, wherein the ground surface height calculating unit calculates the regression equation based on the position and elevation information for some of the plurality of points.

16. The apparatus of claim 15, wherein the ground surface height calculating unit calculates the frequency distribution for the elevations of the plurality of points, selects points having elevations belonging to a rank having a maximum frequency or a minimum frequency in the frequency distribution, and calculates the regression equation on the basis of the position and elevation information for the selected points.

17. A method of calculating a wind load, which calculates the wind load by using a wind load calculating apparatus comprising an information collecting unit, a frequency distribution calculating unit, and a parameter calculating unit, the method comprising:
collecting, by the information collecting unit, height information for a plurality of points in a region;
calculating, by the frequency distribution calculating unit, a frequency distribution for heights of the plurality of points;
allocating, by the frequency distribution calculating unit, ground surface roughness to ranks of the frequency distribution; and
for calculating the wind load, applying, by the parameter calculating unit, weights based on the frequency distribution to parameters set for each ground surface roughness to calculate parameters for the region,
wherein the parameter calculating unit allocates the ground surface roughness according to a rank size,
wherein the parameter calculating unit calculates a relative frequency for each rank and multiplies a parameter set for each ground surface roughness by the relative frequency to sum the multiplied results.

18. A non-transitory computer readable medium having a program recorded thereon, which, when executed by a computer, performs a method of calculating a wind load, the method comprising: collecting, by the information collecting unit, height information for a plurality of points in a region; calculating, by the frequency distribution calculating unit, a frequency distribution for heights of the plurality of points; allocating, by the frequency distribution calculating unit, ground surface roughness to ranks of the frequency distribution; and for calculating the wind load, applying, by the parameter calculating unit, weights based on the frequency distribution to parameters set for each ground surface roughness to calculate parameters for the region, wherein the parameter calculating unit allocates the ground surface roughness according to a rank size, wherein the parameter calculating unit calculates a relative frequency for each rank and multiplies a parameter set for each ground surface roughness by the relative frequency to sum the multiplied results.

* * * * *